United States Patent
Nama et al.

(10) Patent No.: US 11,688,390 B2
(45) Date of Patent: Jun. 27, 2023

(54) DYNAMIC SPEECH RECOGNITION METHODS AND SYSTEMS WITH USER-CONFIGURABLE PERFORMANCE

(71) Applicant: HONEYWELL INTERNATIONAL INC., Charlotte, NC (US)

(72) Inventors: Naveen Venkatesh Prasad Nama, Bangalore (IN); Vasantha Paulraj, Maduri (IN); Robert De Mers, Plymouth, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/448,178

(22) Filed: Sep. 20, 2021

(65) Prior Publication Data

US 2022/0383856 A1    Dec. 1, 2022

(30) Foreign Application Priority Data

May 27, 2021  (IN) .............................. 202111023605

(51) Int. Cl.
*G10L 15/14* (2006.01)
*G06F 3/04847* (2022.01)

(52) U.S. Cl.
CPC ........ *G10L 15/142* (2013.01); *G06F 3/04847* (2013.01)

(58) Field of Classification Search
CPC .......................... G10L 15/142; G06F 3/04847
See application file for complete search history.

(56) References Cited

U.S. PATENT DOCUMENTS

| | | | |
|---|---|---|---|
| 7,286,989 B1 | 10/2007 | Niedermair et al. | |
| 7,606,715 B1 | 10/2009 | Krenz | |
| 9,299,340 B2* | 3/2016 | Kar | ......................... G10L 15/22 |
| 9,550,578 B2 | 1/2017 | McCullough et al. | |
| 10,360,910 B2 | 7/2019 | Valentine et al. | |
| 10,510,338 B2 | 12/2019 | Singleton et al. | |
| 10,770,065 B2 | 9/2020 | Kim et al. | |
| 2006/0149558 A1* | 7/2006 | Kahn | .................... G10L 15/063 |
| | | | 704/278 |

(Continued)

FOREIGN PATENT DOCUMENTS

| | | |
|---|---|---|
| CN | 112614490 A | 4/2021 |
| EP | 3486807 A1 | 5/2019 |

*Primary Examiner* — Jennifer N Welch
*Assistant Examiner* — Ashley M Fortino
(74) *Attorney, Agent, or Firm* — Lorenz & Kopf LLP (57) ABSTRACT

Methods and systems are provided for assisting operation of a vehicle using speech recognition. One method involves identifying a user-configured speech recognition performance setting value selected from among a plurality of speech recognition performance setting values, selecting a speech recognition model configuration corresponding to the user-configured speech recognition performance setting value from among a plurality of speech recognition model configurations, where each speech recognition model configuration of the plurality of speech recognition model configurations corresponds to a respective one of the plurality of speech recognition performance setting values, and recognizing an audio input as an input state using the speech recognition model configuration corresponding to the user-configured speech recognition performance setting value.

17 Claims, 4 Drawing Sheets

(56) References Cited

U.S. PATENT DOCUMENTS

2012/0101817 A1* 4/2012 Mocenigo ............ G10L 15/063
           704/E15.001
2014/0303972 A1  10/2014 Gilbert
2022/0194576 A1*  6/2022 Yang .................... B64C 39/024

* cited by examiner

DYNAMIC SPEECH RECOGNITION METHODS AND SYSTEMS WITH USER-CONFIGURABLE PERFORMANCE

CROSS-REFERENCE TO RELATED APPLICATION(S)

The present application claims benefit of prior filed Indian Provisional Patent Application No. 202111023605, filed May 27, 2021, which is hereby incorporated by reference herein in its entirety.

TECHNICAL FIELD

The subject matter described herein relates generally to vehicle systems, and more particularly, embodiments of the subject matter relate to speech recognition for interfacing with aircraft systems and related cockpit displays.

BACKGROUND

Modern aircraft include numerous avionics systems and other electronic components or modules. An individual aircraft may include, for example, a navigation system, a communication system, a flight management system, an autopilot system, an autothrust system, an electronic flight bag, and a display system. Historically, in some implementations, each system has its own set of user input devices, such as buttons, switches, keys, knobs, sliders, joysticks, and the like, for receiving input from a pilot, co-pilot, or crew. As result, there may be a considerable number of user input devices within the cockpit of the aircraft. Additionally, each avionics system may be associated with its own display.

During operation of the aircraft, it is desirable that a pilot, co-pilot or other crew member, be able to quickly and conveniently interact with the avionics systems to operate the avionics systems and/or obtain information needed to ensure safe operation of the aircraft. Some prior art systems attempt to implement speech recognition and voice command systems to enable a pilot to quickly and reliably interact with the various avionics systems and cockpit components. Speech or voice-based systems are complicated by various aspects of the aircraft operation, such as the operating environment, heightened reliability and accuracy requirements, the time-sensitive nature of some aircraft operations, and other safety concerns. In this regard, there is often a tradeoff between increasing speech recognition accuracy (which improves user experience) and increasing latency (which degrades user experience). Accordingly, it is desirable to provide aircraft systems and methods that facilitate improved user experience without undesirably compromising accuracy. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle, such as an aircraft, using user-configurable speech recognition models to achieve user-configurable recognition performance. One method involves identifying a user-configured speech recognition performance setting value selected from among a plurality of speech recognition performance setting values, selecting a speech recognition model configuration corresponding to the user-configured speech recognition performance setting value from among a plurality of speech recognition model configurations, wherein each speech recognition model configuration of the plurality of speech recognition model configurations corresponds to a respective one of the plurality of speech recognition performance setting values, and recognizing an audio input as an input state using the speech recognition model configuration corresponding to the user-configured speech recognition performance setting value.

In another embodiment, a non-transitory computer-readable medium is provided having computer-executable instructions stored thereon that, when executed by a processing system, cause the processing system to identify a user-configured speech recognition performance setting value selected from among a plurality of speech recognition performance setting values, select a speech recognition model configuration corresponding to the user-configured speech recognition performance setting value from among a plurality of speech recognition model configurations, wherein each speech recognition model configuration of the plurality of speech recognition model configurations corresponds to a respective one of the plurality of speech recognition performance setting values, and recognize an audio input as an input state using the speech recognition model configuration corresponding to the user-configured speech recognition performance setting value.

In another embodiment, a system is provided that includes a user interface comprising a user interface element for selecting a speech recognition performance setting value from among a plurality of speech recognition performance setting values, an audio input device to receive an audio input, and a data storage element to maintain a plurality of speech recognition models for a plurality of speech recognition model configurations. Each speech recognition model configuration of the plurality of speech recognition model configurations corresponds to a respective one of the plurality of speech recognition performance setting values and each speech recognition model configuration of the plurality of speech recognition model configurations corresponds to a different combination of one or more speech recognition models of the plurality of speech recognition models. A processing system is coupled to the audio input device, the data storage element and the user interface to select a respective combination of one or more speech recognition models of the plurality of speech recognition models for a respective speech recognition model configuration corresponding to the speech recognition performance setting value selected by the user interface element and recognizing the audio input as an input state using the respective combination of one or more speech recognition models.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods that facilitate a vehicle operator providing an audio input to one or more onboard systems or displays using one or more dynamic and user-configurable speech recognition models (or model configurations) that achieves the vehicle operator's desired relationship or tradeoff between speech recognition accuracy and latency. In this regard, giving a pilot or other vehicle operator user-configurable control over the speech recognition accuracy and latency (or response time) in a manner that suits his or her own individual preferences improves the user experience, and thereby, the user's acceptance and adoption of speech recognition. For purposes of explanation, the subject matter may be primarily described herein in the context of an aircraft, which may be operating in a controlled airspace; however, the subject matter described herein is not necessarily limited to aircraft or avionic environments, and in alternative embodiments, may be implemented in an equivalent manner for automobiles or ground operations, vessels or marine operations, or otherwise in the context of other types of vehicles and travel spaces, which may be controlled or uncontrolled.

In one or more embodiments, the aircraft system includes a transcription system that utilizes speech recognition to transcribe audio clearance communications received at the aircraft into corresponding textual representations of the received audio clearance communications. For example, audio communications received at the aircraft may be parsed and analyzed using natural language processing to identify or otherwise map an air traffic control (ATC) clearance to particular parameters, settings and/or the like. For purposes of explanation, the transcription system may alternatively be referred to herein as an ATC transcription system or variants thereof. In some embodiments, the ATC transcription system utilizes a speech engine to convert the stream of audio communications received from communications radios or other onboard communications systems into human-readable text that can be displayed on a flight deck display, an electronic flight bag, and/or the like.

In exemplary embodiments, the aircraft system also includes a command system that receives or otherwise obtains voice commands, analyzes the audio content of the voice commands using speech recognition, and outputs control signals to the appropriate onboard system(s) to effectuate the voice command(s). For purposes of explanation, the command system may alternatively be referred to herein as a Voice Activated Flight Deck (VAFD) system or variants thereof. In some VAFD implementations, both the pilot and co-pilot side of the cockpit includes separate sets of hardware or other components configured to support commanding one or more onboard systems using voice modality for performing certain flight deck functions. In this manner, a pilot and co-pilot can independently and simultaneously use the VAFD system to perform tasks. For example, both the pilot and co-pilot may be equipped with a microphone, headset, or other audio input device that supports the pilot or co-pilot providing voice commands to perform various tasks independent of the other one of the pilot and co-pilot. To support voice commands, some VAFD systems include a speech recognition engine that utilizes both acoustic and language models in concert to convert the content of received audio or speech into particular commands that the onboard system(s) are configured to respond to. For example, an acoustic model may be utilized to convert the received audio into a textual representation of the most probable combination and sequence of words that were said, with a language model being utilized to convert that probable combination and sequence of words into a corresponding voice command by performing semantic and/or syntactic analysis to ascertain the intent or objective of the received audio.

In practice, speech recognition is computationally intensive, which may entail latency (or a response time) between when voice command audio is spoken and when a corresponding voice command is recognized or otherwise identified. Such delay can degrade the user experience, particularly in the context of the time-sensitive nature of some aircraft or vehicle operations. While many speech recognition systems are constrained to choices made at design time with respect to the tradeoff between recognition accuracy and latency, the subject matter described herein provides the ability for a pilot, co-pilot, or other vehicle operator to manually configure or tune the relationship between recognition accuracy and latency (or response time) in a user-specific manner at run-time during operation of the aircraft. In this regard, the ATC transcription system and/or the VAFD system may be configurable for different levels of recognition accuracy and corresponding temporal performance based on the different acoustic and language models available to the speech recognition engine. In exemplary embodiments, a slider or similar graphical user interface (GUI) element can be manipulated by a user to dynamically adjust and individually optimize the relationship or tradeoff between the recognition accuracy and latency. For example, a pilot or other user may adjust the slider position in one direction to reduce the latency (or response time) until perceiving the recognition accuracy falling below the user's particular minimum acceptable accuracy standard. Alternatively, the pilot or other user may adjust the slider position in the opposite direction to increase the accuracy until perceiving the response time latency exceeding the user's particular minimum acceptable response time standard. Thus, the pilot or other user can achieve his or her individually-preferred tradeoff or compromise between voice command recognition accuracy and voice command response time. By providing user-specific configurability, users with more easily recognized speech may configure the speech recognition engine to further minimize latency and response time without undesirably compromising accuracy, while other users with more difficult to recognize speech (e.g., due to accents, speech cadence, low volume, sore throat or other physiological conditions, and/or the like) may adjust the speech recognition engine to account for their individual condition or peculiarities and achieve a desired level of accuracy within the user's tolerable response time.

Based on the user configuration of the speech recognition performance setting(s), the acoustic and/or language models utilized by the speech recognition engine may dynamically vary depending on the current performance setting to achieve the desired accuracy and response time. Moreover, in some embodiments, the user-configurable speech recognition performance setting(s) may be context-sensitive and/or specific to particular operating states, flight phases, onboard systems, and/or the like in order to perform more accurately or quickly in accordance with the current operating context. For example, an ATC transcription system may be configured for increased accuracy and slower response time for received ATC communications during the taxiing phase (e.g., to ensure the correct taxi clearance is conveyed and/or adhered to) while being relaxed for increased response time in other flight phases where received ATC communications may be less critical to aircraft operations. Likewise, a VAFD system may be configured for increased accuracy during a pre-departure phase where response time is less significant, while being tailored for reduced response time in other flight phases where reduced latency is more significant to aircraft operation or user experience. In addition to varying depending on the operating context, the user-configurable speech recognition performance setting(s) may also be specific to particular onboard systems. For example, the VAFD system may be configured for increased accuracy when received voice commands are intended for a chart or other navigational display system where response time is less significant, while being tailored for reduced response time with respect to other onboard systems where reduced latency is more significant to aircraft operation or user experience.

In one or more embodiments, multiple different language and acoustic models are developed and trained for multiple different levels of accuracy versus temporal performance (or response time) using different configurations and combinations of model parameters or settings, for example, by varying vocabulary size, varying vocabulary between a global or universal vocabulary and a localized or special purpose vocabulary specific to a particular system or application, varying the number of neural network layers, varying the size of n for the n-gram language model, varying the number of Hidden Markov models (HMM) active per audio frame, varying the number of Guassians evaluated per audio frame, varying the number of search paths to be explored within a recognition graph data structure, varying the number of active states in a search of the recognition graph data structure, and/or the like. For example, in one or more implementations, a speech recognition engine is implemented using two components (or stages), an acoustic model (e.g., for identifying what was said) and a language model (e.g., for determining the meaning of what was said). In this regard, the acoustic model may utilize one or more neural networks, Hidden Markov models, or other suitable recognition models or algorithms configured to probabilistically determine a textual representation of what a speaker intended to say based on audio content input to the acoustic model. The output of the acoustic model is input to the language model, which is configured to probabilistically determine and map the textual representation of the received audio content into a particular command or other discrete state or meaning corresponding to the received audio content. For example, in one or more embodiments, the language model is implemented as a finite state graph configurable to function as or otherwise support a finite state transducer, where the output from the acoustic model (e.g., one or more sequences of words and respective probabilities or confidence scores assigned to the words) is utilized to compute probabilities for the different paths of the finite state graph, with the highest probability path being recognized as the desired user input state which is output by the speech recognition engine to an onboard system.

By varying the depth or complexity of the acoustic model in accordance with the subject matter described herein, the speech recognition engine may be tailored or adjusted in a user-specific manner to ascertain what was said by a user either more accurately (e.g., longer response time but with higher probability or confidence assigned to the output results) or more quickly (e.g., shorter response time but with lower probability or confidence assigned to the output results). Additionally, or alternatively, the search space for the language model may be adjusted (e.g., by varying the number of search paths to be explored and/or the number of active states in a search of the recognition graph data structure) so that the probabilistic pass through the speech recognition graph is either more likely to produce an accurate result or more likely to produce a result with less time required, thereby allowing the speech recognition engine to be tailored to map what was said by a user to a corresponding command state either more accurately or more quickly.

For example, in a two-stage speech recognition system that includes an acoustic model (e.g., for determining what was said based on the received audio) and a language model (e.g., for determining what was meant by what was said output by the acoustic model), a more accurate acoustic model, a quicker acoustic model, a more accurate language model and a quicker language model may be developed and combined in different ways to achieve different levels or tiers of performance. In this regard, the more accurate acoustic model has a structure or configuration that resolves input audio signals to corresponding words or text with a higher accuracy but potentially a slower response time than the quicker acoustic model, which has a structure or configuration that resolves input audio signals to corresponding words or text with a shorter or quicker response time but potentially a lower accuracy than the more accurate acoustic model. For example, relative to a less accurate acoustic model, a more accurate acoustic model may be configured to utilize a greater number of n-grams, a more complex type of text generation method for training n-gram models, or to support a lesser number of use cases or words or an otherwise limited vocabulary of words an acoustic signal can be resolved to (e.g., an aviation-specific vocabulary), such that the output of the more accurate acoustic model is more likely to reflect what was spoken, while a quicker response time acoustic model may utilize a fewer number of n-grams, a less complex type of text generation method for training n-gram models, or to support a greater number of use cases, words or vocabulary of words that an acoustic signal can be resolved to more quickly. Similarly, a more accurate language model has a structure or configuration that maps input text or sequence of words to a particular voice command with a higher accuracy but potentially a slower response time than the quicker acoustic model, which has a structure or configuration that maps input text or sequence of words to a particular voice command with a shorter or quicker response time but potentially a lower accuracy than the more accurate language model.

To provide different tiers of performance tradeoffs between recognition accuracy and response time, the more accurate acoustic and language models may be utilized in combination to achieve the highest accuracy (e.g., 97.5% average accuracy per word) but the slowest average response time (e.g., 0.5 seconds per word) from among the potential model combinations, while the quicker acoustic and language models may be utilized in combination to achieve the quickest (or shortest) average response time (e.g., 0.1 seconds per word) but the lowest accuracy (e.g., 90% average accuracy per word) from among the potential model combinations. Additionally, the more accurate acoustic model may be utilized in combination with the quicker language model, or the quicker acoustic model may be utilized in combination with the more accurate language model to achieve different intermediate levels of response time and performance. For example, the combination of the more accurate acoustic model and the quicker language model combination may achieve an average accuracy of 95% per word and an average response time of 0.375 seconds per word, while the combination of the quicker acoustic model and the more accurate language model combination may achieve an average accuracy of 92.5% per word and an average response time of 0.25 seconds per word. In this regard, the pilot or other user may control which particular combination of acoustic and language models are utilized to achieve a desired tradeoff between accuracy and response time. A pilot prioritizing or preferring accuracy may configure the speech recognition system to use the combination of the more accurate acoustic model and the more accurate language model to achieve the highest available level of accuracy (e.g., 97.5%) but the slowest average response time (e.g., 0.5 seconds per word), while another pilot prioritizing or preferring a quicker response time may configure the speech recognition system to use one or more of the quicker models to achieve a desired tradeoff between accuracy and response time. It should be appreciated that there are numerous potential different configurations and combinations for models to achieve any number of different tiers of performance tradeoffs, and the subject matter described herein is not intended to be limited to any particular implementation.

Figure 3:
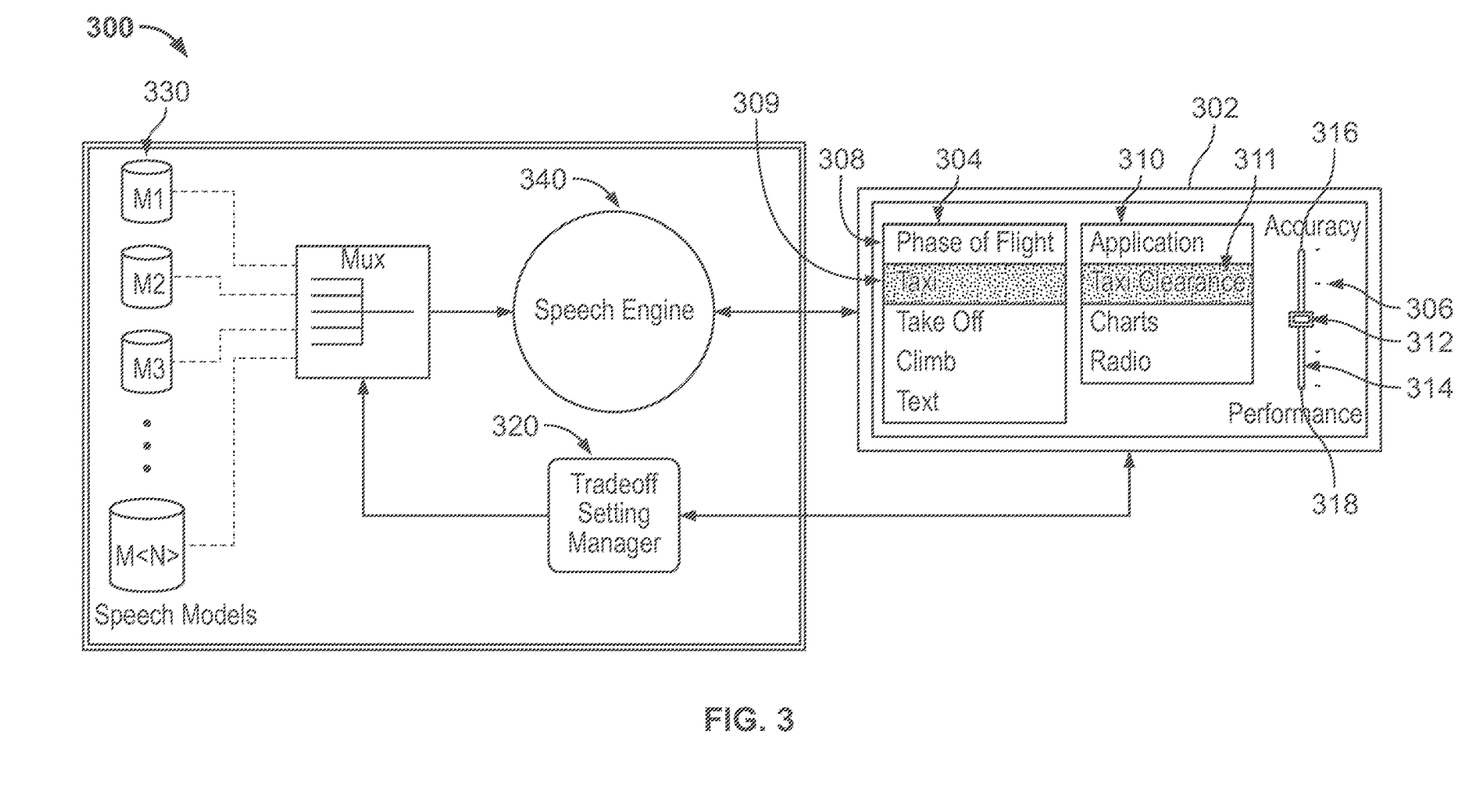
FIG. 3 is a block diagram illustrating a speech recognition system suitable for use with the aircraft system of FIG. 1 in accordance with one or more exemplary embodiments.

In exemplary embodiments, the pilot or user is not be required to directly select or configure the model parameters or settings, but rather, a received user input indicative of a desired speech recognition performance (e.g., a relative position of a slider bar 312 on a slider scale 314), may be mapped to a desired combination and configuration of values for the model parameters or settings that achieves the desired relationship between recognition accuracy and response time within the range of extremes corresponding to the range of potential user input values (e.g., the extreme ends of the slider scale 314). The metadata defining the respective level of accuracy or temporal performance may be embedded in the slider or other GUI element or visualization that allows the pilot or user to dynamically choose a desired recognition performance configuration, which in turn is utilized by the speech recognition engine to construct, generate, or otherwise obtain the acoustic and/or language models corresponding to the desired configuration chosen by the user.

For example, continuing the above example of a two-stage speech recognition system with four different potential model combinations, a slider scale may be gradated with four different potential discrete positions for a slider bar, where each position on the gradated slider scale corresponds to a particular model combination and corresponding performance tradeoff. A first slider bar position at one end of the slider scale may be assigned to the highest accuracy model combination (e.g., accurate acoustic model and accurate language model) that achieves the highest accuracy (e.g., 97.5%) but slowest response time (e.g., 0.5 seconds per word) from among the potential model combinations, while the slider bar position at the opposing end of the slider scale is assigned to the quickest response time model combination (e.g., quicker acoustic model and quicker language model) that achieves the quickest response time (e.g., 0.1 seconds per word) but the lowest accuracy (e.g., 90%) from among the potential model combinations. The intermediate slider bar position on the slider scale closer to the highest accuracy end of the slider scale may be assigned to the second highest accuracy model combination (e.g., accurate acoustic model and quicker language model) that achieves the next highest accuracy (e.g., 95%) but slightly slower response time (e.g., 0.375 seconds per word) than the highest accuracy combination, while the other intermediate slider bar position on the slider scale closer to the quickest response time end of the slider scale may be assigned to the second quickest model combination (e.g., fast acoustic model and accurate language model) that achieves the next quickest response time (e.g., 0.25 seconds per word) but a slightly higher accuracy (e.g., 92.5%) than the quickest response time combination. A pilot or user manipulate or otherwise adjust the position of the slider bar on the slider scale to indicate the desired tradeoff between accuracy and response time from among one of the four different potential slider bar positions, with the position of the slider bar being mapped to the corresponding combination models that achieve the desired relationship between recognition accuracy and response time.

As described in greater detail below, a user profile may be created for an individual that maintains the user's desired performance tradeoff configuration. For example, in one or more embodiments, a pilot, co-pilot, or other user may be allowed to manually configure their respective preferences for accuracy or response time in a manner specific to a particular flight phase or operating state for the aircraft, a particular destination onboard system to be commanded or controlled using speech recognition, a particular type of display to be interacted with using speech recognition, and/or the like. In this regard, the user profile maintains associations between different manually configured performance setting values and the corresponding flight phases, onboard systems, and/or displays associated therewith. Based on the current flight phase or other contextual operating information, the speech recognition engine may utilize the user profile to dynamically identify the desired performance setting value associated with the current flight phase or operating context in real-time and select the corresponding acoustic and/or language models associated with that performance setting value. In this manner, the performance behavior of the speech recognition may dynamically vary during operation of the aircraft to perform more accurately or more quickly in a user-specific manner in accordance with the user's individual configuration.

For example, continuing the above example of a two-stage speech recognition system with four different potential model combinations, when the aircraft is in the taxiing phase, the pilot may move the slider bar to the most accurate position for using speech to input a taxi clearance or other voice commands related to taxiing to ensure accuracy, reduce the likelihood of having to repeat or reenter a taxi clearance, reduce the likelihood of incursions and/or the like. The highest accuracy performance setting value may be stored or otherwise maintained for the pilot in association with the taxiing phase. Thereafter, when the FMS or another onboard system detects that the aircraft is in the taxiing phase or otherwise provides output indicative of the taxiing phase, the speech recognition system may utilize the highest accuracy performance setting value associated with the taxiing phase for the pilot to automatically and dynamically update the acoustic and language models utilized by the speech recognition system during the taxi flight phase. Additionally, when the performance tradeoff slider is presented on a graphical user interface (GUI) display, the position of the slider bar with respect to the slider scale may be automatically and dynamically updated to the accurate end of the slider scale. Conversely, for a takeoff or departure flight phase where response time is more important or preferable to the pilot, the pilot may move the slider bar towards the quicker response time end of the slider scale, with the corresponding performance setting value being stored or otherwise maintained for the pilot in association with the takeoff or departure flight phase. When the FMS or another onboard system indicates that the aircraft has transitioned from the taxi flight phase to the takeoff or departure flight phase, the speech recognition system may utilize the stored performance setting value associated with the takeoff or departure flight phase for the pilot to automatically and dynamically update the acoustic and language models utilized by the speech recognition system and update the position of the slider bar in a corresponding manner in real-time in response to a change in the aircraft flight phase.

In addition to associating different manually configured performance setting values with different flight phases or operating contexts, in some embodiments, different manually configured performance setting values may also be associated with different GUI displays, different avionics systems, and/or the like. For example, the pilot may configure the speech recognition system to utilize the highest accuracy performance setting value when providing voice commands or other speech input to a navigational map GUI display because there is less urgency and repetition would be more burdensome, while configuring the speech recognition system to utilize a quicker response time performance setting value when providing voice commands or other speech input to a communications radio or other communications system where less latency is desired and repetition of the voice command (e.g., a desired radio frequency) is simpler and less burdensome. Thus, a pilot may configure the speech recognition system to perform differently on a per-application or per-system basis in a user-specific manner. In this regard, in some embodiments, the speech recognition system is configured to achieve different performance tradeoff on per-application or per-system basis in a manner that also varies depending on the particular flight phase or operating context.

Figure 1:
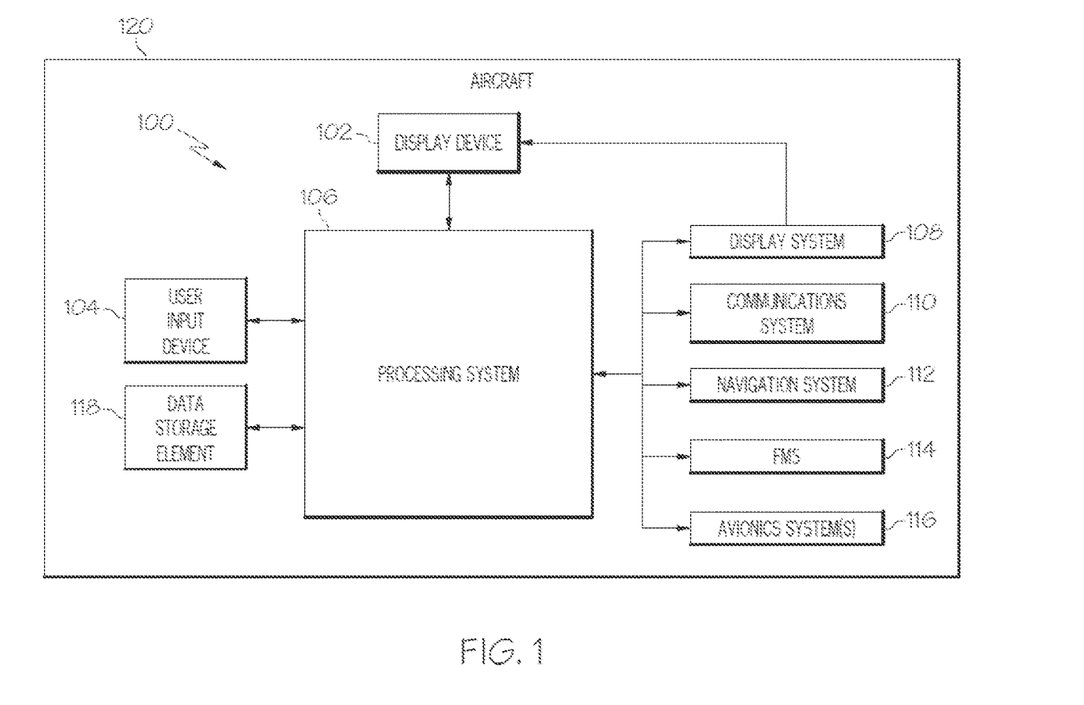
FIG. 1 is a block diagram illustrating a system suitable for use with a vehicle such as an aircraft in accordance with one or more exemplary embodiments.

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

In the illustrated embodiment, the aircraft system 100 includes a data storage element 118, which contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VOR-TACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
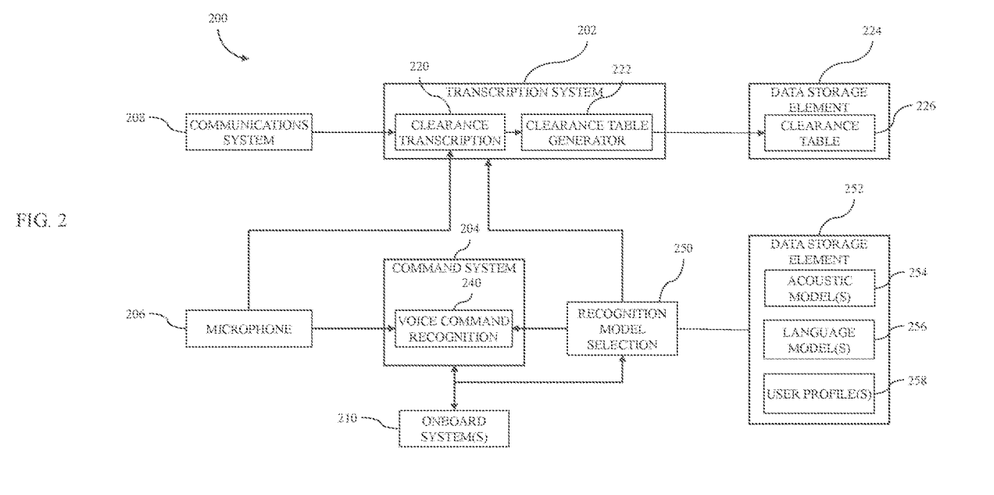
FIG. 2 is a block diagram illustrating a speech recognition system suitable for use with the aircraft system of FIG. 1 in accordance with one or more exemplary embodiments.

FIG. 2 depicts an exemplary embodiment of a speech recognition system 200 for recognizing speech or voice commands. In one or more exemplary embodiments, the speech recognition system 200 is implemented or otherwise provided onboard a vehicle, such as aircraft 120; however, in alternative embodiments, the speech recognition system 200 may be implemented independent of any aircraft or vehicle, for example, at a ground location such as an air traffic control facility. That said, for purposes of explanation, the speech recognition system 200 may be primarily described herein in the context of an implementation onboard an aircraft. The illustrated speech recognition system 200 includes a transcription system 202, a command system 204, an audio input device 206 (or microphone) and one or more communications systems 208 (e.g., communications system 110). The output of the command system 204 is coupled to one or more onboard systems 210 (e.g., one or more avionics systems 108, 110, 112, 114, 116) to provide control signals or other indicia of a recognized control command or user input to the desired destination onboard system 210 (e.g., via an avionics bus or other communications medium) of the voice command for implementation or execution. It should be understood that FIG. 2 is a simplified representation of the speech recognition system 200 for purposes of explanation and ease of description, and FIG. 2 is not intended to limit the application or scope of the subject matter described herein in any way.

The transcription system 202 generally represents the processing system or component of the speech recognition system 200 that is coupled to the microphone 206 and communications system(s) 208 to receive or otherwise obtain clearance communications, analyze the audio content of the clearance communications, and transcribe the clearance communications, as described in greater detail below. The command system 204 generally represents the processing system or component of the speech recognition system 200 that is coupled to the microphone 206 to receive or otherwise obtain voice commands, analyze the audio content of the voice commands, and output control signals to an appropriate onboard system 210 to effectuate the voice command, as described in greater detail below. In some embodiments, the transcription system 202 and the command system 204 are implemented separately using distinct hardware components, while in other embodiments, the features and/or functionality of the transcription system 202 and the command system 204 maybe integrated and implemented using a common processing system (e.g., processing system 106). In this regard, the transcription system 202 and the command system 204 may be implemented using any sort of hardware, firmware, circuitry and/or logic components or combination thereof. In one or more exemplary embodiments, the transcription system 202 and the command system 204 are implemented as parts of the processing system 106 onboard the aircraft 120 of FIG. 1.

The audio input device 206 generally represents any sort of microphone, audio transducer, audio sensor, or the like capable of receiving voice or speech input. In this regard, in one or more embodiments, the audio input device 206 is realized as a microphone (e.g., user input device 104) onboard the aircraft 120 to receive voice or speech annunciated by a pilot or other crewmember onboard the aircraft 120 inside the cockpit of the aircraft 120. The communications system(s) 208 (e.g., communications system 110) generally represent the avionics systems capable of receiving clearance communications from other external sources, such as, for example, other aircraft, an air traffic controller, or the like. Depending on the embodiment, the communications system(s) 208 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like. In exemplary embodiments described herein, the transcription system 202 receives or otherwise obtains one or more speech recognition models which are utilized by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 206, a radio communications system 208, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 208 (e.g., a CPDLC system). The clearance table generator 222 parses or otherwise analyzes the textual representation of the received clearance communications and generates corresponding clearance communication entries in a table 226 in the memory 224. In this regard, the clearance table 226 maintains all of the clearance communications received by the transcription system 202 from either the onboard microphone 206 or an onboard communications system 208.

In exemplary embodiments, for each clearance communication received by the clearance table generator 222, the clearance table generator 222 parses or otherwise analyzes the textual content of the clearance communication using natural language processing and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 226 that maintains an association between the textual content of the clearance communication and the identified fields associated with the clearance communication. Additionally, the clearance table generator 222 may analyze the new clearance communication entry relative to existing clearance communication entries in the clearance table 226 to identify or otherwise determine a conversational context to be assigned to the new clearance communication entry.

Still referring to FIG. 2, the processor, control module, or other hardware associated with the command system 204 executes computer-executable programming instructions that cause the command system 204 to generate, execute, or otherwise implement a voice command recognition application 240 capable of analyzing, parsing, or otherwise processing voice, speech, or other audio user input received by the command system 204 via the microphone 206 to convert the received audio into a corresponding command intended for a particular destination output system 210. In this regard, command recognition application 240 implements or otherwise supports a speech recognition engine (or voice recognition engine) or other speech-to-text system. In exemplary embodiments, the recognition engine implemented by the command recognition application 240 is realized using a two-stage probabilistic recognition scheme that includes an acoustic model and a language model realized as a finite state directed graph data structure, where the acoustic scores from the acoustic model are utilized to compute probabilities for the different paths (or sequences of nodes and edges) of the finite state graph data structure, with the highest probability path being recognized as the desired command input by the user, for which corresponding control signals are then output by the command recognition application 240 to the appropriate onboard system 210 for implementing or executing the recognized command.

Still referring to FIG. 2, the speech recognition system 200 includes a recognition model selection system 250 that is configured to select and provide speech recognition models to the transcription system 202 and the command system 204 according to a user-configured performance setting value. Depending on the embodiment, the recognition model selection system 250 may be implemented separately, or integrated and implemented with one or more of the transcription system 202 and the command system 204 using a common processing system (e.g., processing system 106). In this regard, the processor, control module, or other hardware associated with the recognition model selection system 250 executes computer-executable programming instructions that cause the processor to generate, execute or otherwise implement the recognition model selection system 250 and support or otherwise perform the functionality described herein. In exemplary embodiments, the recognition model selection system 250 includes or is otherwise coupled to a data storage element 252 (or memory) that stores or otherwise maintains a plurality of different acoustic models 254 corresponding to different levels of accuracy and/or response time along with a plurality of different language models 256 corresponding to different levels of accuracy and/or response time.

For example, as described above, each acoustic model 254 may be trained using a different vocabulary size, a different number of neural network layers, a different number of Hidden Markov models, a different recognition feature size (e.g., varying the size of n for the n-gram language model), and/or the like to provide a gradation of accuracy and response time combinations that may progressively trade accuracy improvements for increases in response time, or vice versa. For example, one acoustic model 254 may be optimized to maximize recognition accuracy (e.g., the most accurate acoustic model) at the expense of increased latency or response time, while another acoustic model 254 may be optimized to minimize response time or latency (e.g., the quickest acoustic model) at the expense of reduced accuracy. Any number of additional acoustic models 254 may be developed to achieve different tradeoffs between accuracy and response time (e.g., by varying the vocabulary size, neural network layers, Hidden Markov models, recognition feature sizes, etc.) between the most accurate acoustic model 254 and the quickest acoustic model 254. In a similar manner, each language model 256 may be realized as a respective recognition graph structure constructed using a different vocabulary sizes (e.g., ranging from a generic or universal vocabulary to a limited command vocabulary) and/or a different recognition feature size to vary the size and depth of the recognition graph structure, thereby varying the number of search paths to be explored or the number of active states in a search of the recognition graph data structure and similarly providing a gradation of accuracy and response time combinations that may progressively trade accuracy improvements for increases in response time, or vice versa. For example, one language model 256 may be optimized to maximize recognition accuracy, another language model 256 may be optimized to minimize response time or latency, and any number of additional language models 256 may be developed to achieve different tradeoffs between accuracy and response time.

In one or more embodiments, each of the models 254, 256 may be associated with one or more values for a performance tradeoff parameter setting value, thereby allowing a performance tradeoff parameter setting value to be mapped to a corresponding combination of recognition models 254, 256 to be utilized to achieve that performance tradeoff. For example, for a two-stage speech recognition system with four different potential model combinations, a first performance tradeoff parameter setting value corresponding to the highest accuracy may be associated with or otherwise mapped to the combination of the highest accuracy acoustic model 254 and the highest accuracy language model 256, while a second performance tradeoff parameter setting value corresponding to the quickest (or shortest) response time may be associated with or otherwise mapped to the combination of the quickest acoustic model 254 and the quickest language model 256, with intermediate performance tradeoff parameter setting values being mapped to different combinations of accurate and quick recognition models 254, 256 that achieve different performance tradeoffs within the range of potential response times and accuracy performance capabilities of the recognition models 254, 256.

In exemplary embodiments, the data storage element 252 also maintains one or more user profiles 258 that maintain, for each individual user supported by the speech recognition system 200, associations between one or more performance tradeoff setting values that were previously manually configured by the user and one or more flight phases, onboard systems, and/or displays associated with the respective manually configured performance tradeoff setting values. In this regard, the recognition model selection system 250 may be coupled to one or more onboard systems 210 to receive indicia of the current flight phase or other operational context, which, in turn, may be utilized to select or otherwise identify the desired performance tradeoff setting value associated with the current operating state in real-time and dynamically provide the corresponding models 254, 256 to achieve that speech recognition performance to the transcription system 202 and/or the command system 204.

Referring to FIGS. 1-2, during operation of the aircraft 120, based on the current performance tradeoff parameter setting value indicated by a GUI element configured by a user or the stored performance tradeoff setting value associated with the current operating state indicated by the user's profile 258, the recognition model selection system 250 selects, obtains, or otherwise identifies the speech recognition models 254, 256 corresponding to that performance tradeoff parameter setting value and provides the selected speech recognition models 254, 256 to the transcription system 202 and/or the command system 204 for implementation. For example, when the current performance tradeoff setting value corresponds to the most accurate setting, the recognition model selection system 250 may select the most accurate acoustic model 254 (e.g., the acoustic model trained with the highest number of neural network layers, Hidden Markov models, and/or the like) and provides that acoustic model 254 to the clearance transcription application 220, which, in turn, converts received audio inputs into transcribed textual representations using the most accurate acoustic model 254. The recognition model selection system 250 may also select the most accurate language model 256 (e.g., a recognition graph data structure with the most potential search paths, etc.) and provides that language model 256 to the clearance table generator 222, which, in turn, analyzes the output of the clearance transcription application 220 using that language model 256 to extract or otherwise identify operational parameters contained within a clearance communication, the operational objective or intent of the clearance communication, and/or the like. In a similar manner, the recognition model selection system 250 may select and provide the most accurate models 254, 256 to the voice command recognition application 240, which, in turn, utilizes the most accurate acoustic model 254 to convert received command audio into a textual representation before utilizing the most accurate language model 256 to map that textual representation to a voice command corresponding the received audio. As a result, the received command audio may be accurately mapped to a particular command.

On the other hand, when the current performance tradeoff setting value corresponds to the shortest (or quickest) response time setting, the recognition model selection system 250 may select the acoustic model 254 having the best response time (e.g., the quickest acoustic model trained with the fewest number of neural network layers, Hidden Markov models, and/or the like) and provide the quickest acoustic model 254 to the clearance transcription application 220, while selecting the lowest latency language model 256 (e.g., the recognition graph data structure with the fewest potential search paths, etc.) and providing the quickest language model 256 to the clearance table generator 222. In a similar manner, the recognition model selection system 250 may select the quickest (or lowest latency) models 254, 256 and provide those models 254, 256 to the voice command recognition application 240. As a result, the received command audio may be more quickly mapped to a particular command.

FIG. 3 depicts a speech recognition system 300 configured to support the subject matter described herein. The speech recognition system 300 includes a performance tradeoff configuration GUI display 304 that is rendered or otherwise presented on a display device 302 (e.g., display device 102). The performance tradeoff configuration GUI display 304 includes a slider 306 having a slider bar 312 overlying a scale 314, where the slider bar 312 is manipulable by a user relative to the scale 314 such that the relative position of the slider bar 312 with respect to the slider scale 314 corresponds the user's desired performance tradeoff setting value.

Referring to FIG. 3 with continued reference to FIGS. 1-2, the performance tradeoff configuration GUI display 304 also includes a first list box 308 (or similar GUI element) that is configurable to allow the user to define a flight phase or operating state to be associated with the current performance tradeoff setting value indicated by the slider 306. Additionally, the performance tradeoff configuration GUI display 304 includes a second list box 310 (or similar GUI element) that is configurable to allow the user to define a particular destination onboard system 108, 110, 112, 114, 116, 210 (or a particular GUI display, software application, and/or the like) to be associated with the current performance tradeoff setting value indicated by the slider 306. In this regard, a pilot or other user may utilize the slider 306 in concert with the list boxes 308, 310 to create and configure his or her user profile 258 by designating different performance tradeoff setting values to be utilized for different combinations of flight phases and/or onboard systems 108, 110, 112, 114, 116, 210 for which the audio input pertains.

The speech recognition system 300 includes a tradeoff setting manager 320 (e.g., recognition model selection system 250) that is configured to select or otherwise identify a subset of one or more particular speech recognition models 330 (e.g., speech recognition models 254, 256) to be provided to a speech engine 340 (e.g., clearance transcription application 220, voice command recognition application 240, etc.) for use in recognizing or otherwise resolving input audio to a discrete output (e.g., a textual representation, a digital representation, a discrete command or command state, etc.). In this regard, as described above, the speech recognition system 300 includes a plurality of different speech recognition models 330 (e.g., M1–M<N>) that are configured to provide a gradation of performance behaviors corresponding to different tradeoffs or combinations between recognition accuracy and response time. In some embodiments, based on the position of the slider bar 312 indicated by the slider 306, the tradeoff setting manager 320 may identify the corresponding performance tradeoff setting value desired by the user in real-time and dynamically provide the corresponding recognition model(s) 330 to the speech engine 340 for implementation and/or utilization in recognizing subsequently received audio input. In embodiments where the user profile 258 stores or otherwise maintains the user's previously configured associations between performance tradeoff setting values, flight phases and onboard systems 108, 110, 112, 114, 116, 210, the tradeoff setting manager 320 may continually monitor the output from an onboard system 210 (e.g., the navigation system 112, the FMS 114, and/or the like) to identify the current flight phase in real-time and dynamically update the recognition model(s) 330 that are provided to and utilized by the speech engine 340 in response to changes to the flight phase or other operational information. In some embodiments, the tradeoff setting manager 320 may also monitor or otherwise determine which onboard systems 108, 110, 112, 114, 116, 210 (or which display or software functionality associated therewith) that the user is attempting to interact with using voice commands in real-time and dynamically update the recognition model(s) 330 that are provided to and utilized by the speech engine 340 to provide the user's desired level of accuracy and/or latency when interacting with that particular onboard system 108, 110, 112, 114, 116, 210.

Still referring to FIG. 3 with reference to FIGS. 1-2, continuing the above example of a two-stage speech recognition system, the position of the slider bar 312 on the slider scale 314 is mapped to a desired combination and configuration of values for the model parameters or settings that achieves the desired relationship between recognition accuracy and response time within the range of extremes corresponding to the range of potential user input values. For example, the user may adjust the position of the slider bar 312 to the accurate end position 316 on the slider bar 312 to select or otherwise enable the combination of the most accurate acoustic model and most accurate language model for use with the selected application or onboard system (e.g., a taxi clearance application or taxi clearance GUI display) indicated by the selection 311 in the list box 310 during the selected flight phase (e.g., taxiing) indicated by the selection 309 in the list box 308. Conversely, positioning the slider bar 312 to the quickest response time end position 318 on the slider bar 312 to select or otherwise enable the combination of the quickest acoustic model and quickest language model for use with the selected application or onboard system indicated by the list box 310 during the selected flight phase indicated by the list box 308. In this regard, FIG. 3 depicts the slider bar 312 positioned at an intermediate position between the most accurate end position 316 and the quickest response time end position 318 to achieve an intermediate tradeoff between accuracy and response time.

A corresponding user profile may be created for the pilot that maintains the performance tradeoff parameter setting value indicated by the position of the slider bar 312 for the combination of the selected flight phase indicated by the flight phase list box 308 and the application or onboard system indicated by the list box 310. Thereafter, when the current flight phase corresponds to the taxiing flight phase, the recognition model selection system 250 automatically selects, obtains, or otherwise identifies the speech recognition models 254, 256 corresponding to that performance tradeoff parameter setting value and provides the selected speech recognition models 254, 256 to the transcription system 202 and/or the command system 204 for implementation during the taxiing flight phase with respect to a taxi clearance application or taxi clearance GUI display. In this regard, for each potential combination of selected flight phase in the flight phase list box 308 and destination application or onboard system in the list box 310, the user profile may maintain a corresponding performance tradeoff parameter setting value that is user-configurable by adjusting the position of the slider bar 312 when the particular contextual combination is selected within the list boxes 308, 310. For example, the pilot may select the takeoff flight phase in the list box 308 and the radio application in the list box 310 and then adjust the slider bar 312 to the quicker end position 318 on the slider scale 314 to utilize the quickest speech recognition models 254, 256 for the radio application during the takeoff flight phase. Additionally, while the takeoff flight phase is selected in the list box 308, the pilot may select the navigational map GUI displays ("Charts") in the list box 310 and then adjust the slider bar 312 to the accurate end position 316 on the slider scale 314 to utilize the most accurate speech recognition models 254, 256 for the radio application during the takeoff flight phase. When the FMS or another onboard system indicates that the aircraft has transitioned from the taxi flight phase to the takeoff flight phase, the speech recognition system may utilize the stored performance setting values for the pilot for the takeoff flight phase to automatically and dynamically update the speech recognition system in real-time to utilize the quickest acoustic and language models with respect to the radio application while using the most accurate acoustic and language models with respect to the navigational GUI displays during the takeoff flight phase. In this regard, the speech recognition system may respond to voice commands differently during the takeoff flight phase depending on which GUI displays or onboard systems the pilot is attempting to provide voice commands to in accordance with the pilot's previously-configured, user-specific performance tradeoff setting values.

Figure 4:
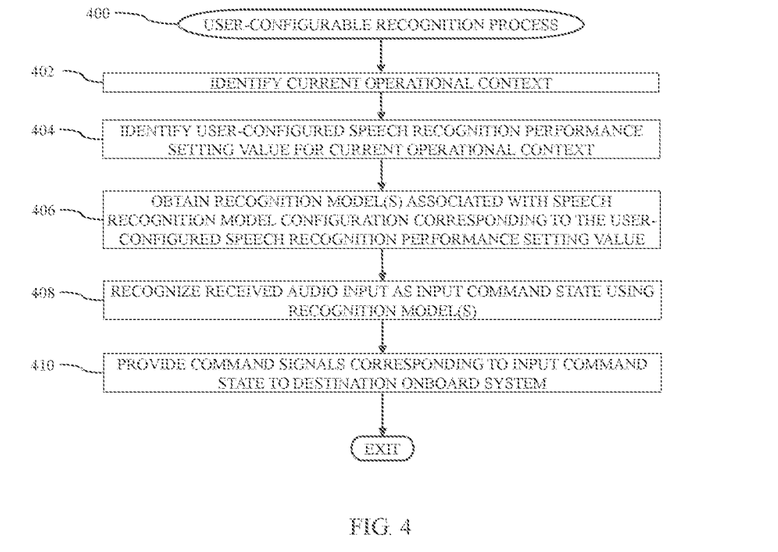
FIG. 4 is a flow diagram of a user-configurable recognition process suitable for implementation by a speech recognition system associated with a vehicle in accordance with one or more exemplary embodiments.

FIG. 4 depicts an exemplary embodiment of a user-configurable recognition process 400 suitable for implementation by a speech recognition system. The various tasks performed in connection with the user-configurable recognition process 400 may be implemented using hardware, firmware, software executed by processing circuitry, or any combination thereof. For example, in one or more embodiments, the steps of the user-configurable recognition process 400 can be embodied in computer-executable programming instructions or other data for execution that are stored or otherwise maintained in a data storage element and when read and executed cause a processing system to execute, perform or otherwise support the user-configurable recognition process 400 and the related tasks, operations, and/or functions described herein. It should be appreciated that the user-configurable recognition process 400 may include any number of additional or alternative tasks, the tasks need not be performed in the illustrated order and/or the tasks may be performed concurrently, and/or the user-configurable recognition process 400 may be incorporated into a more comprehensive procedure or process having additional functionality not described in detail herein. Moreover, one or more of the tasks shown and described in the context of FIG. 4 could be omitted from a practical embodiment of the user-configurable recognition process 400 as long as the intended overall functionality remains intact.

The illustrated user-configurable recognition process 400 initializes or otherwise begins by identifying or otherwise determining the current operational context for an input audio command (or voice command) and the corresponding user-configured speech recognition performance setting value associated with the current operational context (tasks 402, 404). For example, as described above in the context of FIGS. 1-2, the recognition model selection system 250 may be coupled to one or more onboard systems 210 (e.g., one or more avionics systems 108, 110, 112, 114, 116) to receive indicia of the current flight phase or other operational context, the current aircraft configuration, the currently displayed GUI displays, and/or the like concurrent or contemporaneous to receiving the audio input for the input audio command. Based on the current flight phase or other operational context of the aircraft 120, the recognition model selection system 250 utilizes the user profile entry 258 associated with the pilot or other individual operating the aircraft 120 to identify the pilot's previously-configured speech recognition performance setting value associated with the current operational context. In this regard, in embodiments where the pilot or other user has configured speech recognition performance setting values on a per GUI display or per destination onboard system basis, the recognition model selection system 250 utilizes the user profile 258 to identify the previously-configured speech recognition performance setting value associated with the currently displayed GUI displays for the current flight phase.

After identifying the user-configured speech recognition performance setting value associated with the current operational context for the input audio command, the user-configurable recognition process 400 continues by retrieving or otherwise obtaining the speech recognition model(s) associated with the particular speech recognition model configuration corresponding to the user-configured speech recognition performance setting value (task 406). For example, when the user profile 258 indicates the most accurate speech recognition performance setting value for the current flight phase, the recognition model selection system 250 retrieves or otherwise obtains the most accurate acoustic and language models 254, 256 and provides the accurate models 254, 256 associated with the most accurate speech recognition model configuration to the voice command recognition application 240.

After obtaining the speech recognition model(s) associated with the speech recognition model configuration corresponding to the user-configured speech recognition performance setting value, the user-configurable recognition process 400 continues by recognizing, resolving, or otherwise mapping the received audio input to a particular input command state using the obtained speech recognition model(s) and transmitting or otherwise providing command signals corresponding to that input command state to the appropriate destination onboard system (tasks 408, 410). In this regard, the voice command recognition application 240 converts audio input signals input received via the microphone 206 to a corresponding textual representation using the acoustic model 254 corresponding to the user-configured speech recognition performance setting value that was provided by the recognition model selection system 250 before using the language model 256 corresponding to the user-configured speech recognition performance setting value that was provided by the recognition model selection system 250 to probabilistically map the textual representation to a particular voice command. After mapping the received audio to a particular voice command state, the voice command recognition application 240 transmits, outputs or otherwise provides control signals for effectuating the voice command to the appropriate destination onboard system 210.

By virtue of the user-configurable recognition process 400, a pilot, co-pilot or other vehicle operator or user can manually configure different performance setting values for different flight phases or operating contexts, different GUI displays, different avionics systems, and/or the like, thereby allowing the performance of the speech recognition system to be personalized in a user-specific manner. Allowing a pilot to configure the speech recognition system to perform differently in a context-sensitive manner, and potentially on a per-application or per-system basis, in a user-specific manner improves user experience. Improving user experience improves user acceptance and adoption of speech recognition, thereby allowing pilots to increasingly interact with onboard avionics in a hands free manner that allows pilots to maintain focus on operating the aircraft.

For the sake of brevity, conventional techniques related to graphical user interfaces, graphics and image processing, speech recognition, artificial intelligence, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting operation of a vehicle, the method comprising:
dynamically identifying, during operation of the vehicle, a current user-configured speech recognition performance setting value associated with a current operational context associated with the vehicle, wherein the current user-configured speech recognition performance setting value is selected from among a plurality of speech recognition performance setting values;
selecting a speech recognition model configuration corresponding to the current user-configured speech recognition performance setting value from among a plurality of speech recognition model configurations by mapping the current user-configured speech recognition performance setting value to a combination of an acoustic model from among a plurality of different acoustic models and a language model from among a plurality of different language models, wherein each speech recognition model configuration of the plurality of speech recognition model configurations comprises a different combination of a respective acoustic model of the plurality of different acoustic models and a respective language model of the plurality of different language models corresponding to a respective one of the plurality of speech recognition performance setting values; and
recognizing an audio input as an input command using the speech recognition model configuration corresponding to the current user-configured speech recognition performance setting value by:
converting the audio input into a textual representation comprising a probable combination of words using the acoustic model associated with the speech recognition model configuration corresponding to the current user-configured speech recognition performance setting value; and
converting the textual representation into the input command using the language model associated with the speech recognition model configuration corresponding to the current user-configured speech recognition performance setting value.

2. The method of claim 1, wherein:
the plurality of speech recognition performance setting values correspond to a variable recognition accuracy or a variable response time; and
the plurality of speech recognition model configurations are configured to vary recognition accuracy or response time according to the respective one of the plurality of speech recognition performance setting values associated therewith.

3. The method of claim 1, further comprising determining the plurality of different acoustic models and the plurality of different language models by varying one or more model parameters associated with respective ones of the plurality of different acoustic models and the plurality of different language models.

4. The method of claim 3, wherein varying the one or more model parameters comprises varying at least one of a vocabulary, a number of neural network layers, a recognition feature size, a number of Hidden Markov models (HMM), a number of Guassians, a number of search paths and a number of active states in a search associated with the respective ones of the plurality of different acoustic models and the plurality of different language models.

5. The method of claim 1, further comprising providing a performance tradeoff configuration graphical user interface (GUI) display including a GUI element configurable to receive the current user-configured speech recognition performance setting value.

6. The method of claim 5, wherein:
the GUI element comprises a slider comprising a slider bar having a position with respect to a scale; and
the position corresponds to the current user-configured speech recognition performance setting value.

7. The method of claim 1, further comprising providing during run time, ability for a pilot to make a choice during run time that would allow trading off between different levels of accuracy and performance.

8. The method of claim 1, further comprising identifying the current operational context associated with the vehicle.

9. The method of claim 8, wherein:
the vehicle comprises an aircraft;
identifying the current operational context comprises identifying a current flight phase for the aircraft; and
dynamically identifying the current user-configured speech recognition performance setting value comprises identifying the current user-configured speech recognition performance setting value associated with the current flight phase.

10. The method of claim 1, wherein:
dynamically identifying the current user-configured speech recognition performance setting value comprises identifying a user-configured speech recognition performance setting value associated with a destination system onboard the vehicle; and
recognizing the audio input as the input command comprises:
recognizing an input voice command for the destination system using the speech recognition model configuration corresponding to the user-configured speech recognition performance setting value associated with the destination system; and
providing indication of the input voice command to the destination system.

11. The method of claim 1, wherein when the current user-configured speech recognition performance setting value corresponds to a most accurate setting value from among the plurality of speech recognition performance setting values, selecting the speech recognition model configuration comprises selecting the speech recognition model configuration having a highest accuracy from among the plurality of speech recognition model configurations.

12. The method of claim 1, wherein when the current user-configured speech recognition performance setting value corresponds to a quickest response time setting value from among the plurality of speech recognition performance setting values, selecting the speech recognition model configuration comprises selecting the speech recognition model configuration having a quickest response time from among the plurality of speech recognition model configurations.

13. A non-transitory computer-readable medium having computer-executable instructions stored thereon that, when executed by a processing system, cause the processing system to:
dynamically identify a current user-configured speech recognition performance setting value selected from among a plurality of speech recognition performance setting values associated with a current operational context during operation of a vehicle;
select a speech recognition model configuration corresponding to the current user-configured speech recognition performance setting value from among a plurality of speech recognition model configurations by mapping the current user-configured speech recognition performance setting value to a combination of an acoustic model from among a plurality of different acoustic models and a language model from among a plurality of different language models, wherein each speech recognition model configuration of the plurality of speech recognition model configurations comprises a different combination of a respective acoustic model of the plurality of different acoustic models and a respective language model of the plurality of different language models corresponding to a respective one of the plurality of speech recognition performance setting values; and recognize an audio input as an input command using the speech recognition model configuration corresponding to the current user-configured speech recognition performance setting value by:

converting the audio input into a textual representation comprising a probable combination of words using the acoustic model associated with the speech recognition model configuration corresponding to the current user-configured speech recognition performance setting value; and converting the textual representation into the input command using the language model associated with the speech recognition model configuration corresponding to the current user-configured speech recognition performance setting value.

14. The computer-readable medium of claim 13, wherein:

the plurality of speech recognition performance setting values correspond to a variable recognition accuracy or a variable response time; and the plurality of speech recognition model configurations are configured to vary recognition accuracy or response time according to the respective one of the plurality of speech recognition performance setting values associated therewith.

15. The computer-readable medium of claim 14, wherein:

the plurality of different acoustic models and the plurality of different language models are determined by varying one or more model parameters associated with respective ones of the plurality of different acoustic models and the plurality of different language models.

16. The computer-readable medium of claim 14, wherein the computer-executable instructions cause the processing system to provide a performance tradeoff configuration graphical user interface (GUI) display including a GUI element configurable to receive the current user-configured speech recognition performance setting value.

17. A system comprising:

a user interface comprising a user interface element for selecting a current speech recognition performance setting value from among a plurality of speech recognition performance setting values to be associated with a current operational context during operation of a vehicle;

a data storage element to maintain a plurality of speech recognition models for a plurality of speech recognition model configurations, wherein each speech recognition model configuration of the plurality of speech recognition model configurations corresponds to a respective one of the plurality of speech recognition performance setting values and each speech recognition model configuration of the plurality of speech recognition model configurations corresponds to a different combination of a respective acoustic model of a plurality of different acoustic models and a respective language model of a plurality of different language models;

an audio input device to receive an audio input; and a processing system coupled to the audio input device, the data storage element and the user interface to select a respective combination of one or more speech recognition models of the plurality of speech recognition models for a respective speech recognition model configuration corresponding to the current speech recognition performance setting value selected by the user interface element and recognizing the audio input as an input command using the respective combination of one or more speech recognition models by converting the audio input into a textual representation comprising a probable combination of words using the acoustic model associated with the speech recognition model configuration corresponding to the current speech recognition performance setting value and converting the textual representation into the input command using the language model associated with the speech recognition model configuration corresponding to the current speech recognition performance setting value.

* * * * *